United States Patent [19]

Nilsson et al.

[11] Patent Number: 5,725,247

[45] Date of Patent: Mar. 10, 1998

[54] END SECTION OF FRAME MEMBER

[75] Inventors: Nils Nilsson; Göran Levin, both of Göteborg, Sweden

[73] Assignee: AB Volvo, Sweden

[21] Appl. No.: 628,611

[22] PCT Filed: Oct. 7, 1994

[86] PCT No.: PCT/SE94/00935

§ 371 Date: May 30, 1996

§ 102(e) Date: May 30, 1996

[87] PCT Pub. No.: WO95/10442

PCT Pub. Date: Apr. 20, 1995

[30] Foreign Application Priority Data

Oct. 12, 1993 [SE] Sweden .................... 9303335

[51] Int. Cl.⁶ .................... B62D 21/00

[52] U.S. Cl. .................... 280/781; 280/800; 29/897.2; 29/897.35

[58] Field of Search .................... 280/781, 800, 280/799, 789, 797, 798, 785; 296/30, 204; 29/897.2, 897.35

[56] References Cited

U.S. PATENT DOCUMENTS

| | | | |
|---|---|---|---|
| 824,550 | 6/1906 | Lazerges | 296/204 |
| 1,349,589 | 8/1920 | Sweet | 280/800 |
| 2,165,074 | 7/1939 | Sherman | 280/800 |
| 2,277,615 | 3/1942 | Townsend | 29/897.35 |
| 3,612,569 | 10/1971 | Marinelli | 29/897.2 |

FOREIGN PATENT DOCUMENTS

| | | | |
|---|---|---|---|
| 1230357 | 12/1987 | Canada. | |
| 1077992 | 3/1960 | Germany. | |
| 2117414 | 10/1972 | Germany. | |
| 2-151578 | 6/1990 | Japan | 280/800 |
| 814804 | 3/1981 | U.S.S.R. | 280/789 |
| 945649 | 1/1964 | United Kingdom. | |

*Primary Examiner*—Peter C. English
*Attorney, Agent, or Firm*—Lerner, David, Littenberg, Krumholz & Mentlik

[57] ABSTRACT

Frame members for load-bearing vehicles are disclosed including upper and lower supports connected by a connecting portion and in which the end of the frame has a decreasing height towards the end thereof and an attachment plate for maintaining the relative positions of the upper and lower portions of the end of the frame. Methods for providing these frames are also disclosed.

6 Claims, 3 Drawing Sheets

END SECTION OF FRAME MEMBER

FIELD OF THE INVENTION

The present invention relates to an end section for a frame member.

BACKGROUND OF THE INVENTION

With certain types of load-carrying vehicles it is advantageous to shape sections of the frame member with a gradually diminishing height. Such load-carrying vehicles can be semi-trailers, for example, in which the coupling plate of the trailer unit can slide onto the coupling plate of the tractor unit while the front end of the trailer unit is lifted. In this regard, for example, a tapered end section has been formed by welding the upper supporting section of the frame member, i.e., its flange, to a web section of diminishing height in order to obtain the desired inclined surface. Such a specially designed end section is thereafter welded to the end of the frame member of the load-carrying vehicle. Another known solution to this problem is to use separate sliding plates which are attached to the rear end of the frame members by means of screwed or riveted joints. A further solution is to obtain the inclined surfaces by compression pressing of the ends of the frame members. All such previously known solutions present the disadvantage that they are relatively costly and complicated to manufacture.

SUMMARY OF THE INVENTION

In accordance with the present invention, these and other objects have now been realized by the invention of a frame member including an end for a load-bearing vehicle comprising an upper support section, a lower support section, a connecting section joining said upper and lower support sections, the frame member including an end portion having a height representing the distance between the upper and lower support sections which decreases in the direction towards the end, the end portion including an upper end portion and a lower end portion separated by a dividing line, the upper and lower end portions meeting at a central end portion, and attachment means for maintaining the relative positions of the upper and lower end portions, the attachment means including first affixing means for affixing the attachment means to the upper end portion and second affixing means for affixing the attachment means to the lower end portion.

In accordance with one embodiment of the frame member of the present invention, the dividing line extends from a first point to the end of the frame member, the first point being proximate to the upper support section and at least the portion of the dividing line proximate to the first point extending towards the central end portion.

In accordance with a preferred embodiment of the frame member of the present invention, the frame member includes a crossbar extending transversely of the frame member, the attachment means attached to the crossbar.

In accordance with another embodiment of the frame member of the present invention, the first point comprises a hole through the connecting section.

In accordance with another embodiment of the frame member of the present invention, the attachment means comprises a first attachment member on a first side of the end section, and the frame member includes a second attachment member on a second side of the end section.

In accordance with the method of the present invention, a method is provided for producing a frame member including an end for a load-bearing vehicle, the method including providing a frame member including an upper support section, a lower support section and a connecting section joining said upper and lower sections, cutting out a wedge-shaped section of the connecting section so as to create an upper end portion and a lower end portion, bending the upper support section towards the lower support section at the end of the frame member so as to provide an end portion of the frame member having a height representing the distance between the upper and lower support sections which decreases in a direction towards the end, and attaching the upper end portion to the lower end portion so as to maintain the relative positions of the upper and lower end portions.

It is therefore an object of this invention to eliminate these above-noted problems and to provide an end section which is cost effective without diminishing the demands for strength thereon.

BRIEF DESCRIPTION OF THE DRAWINGS

The invention will be described in the following in connection with an embodiment and with reference to the annexed drawings, in which.

DETAILED DESCRIPTION

Figure 1:
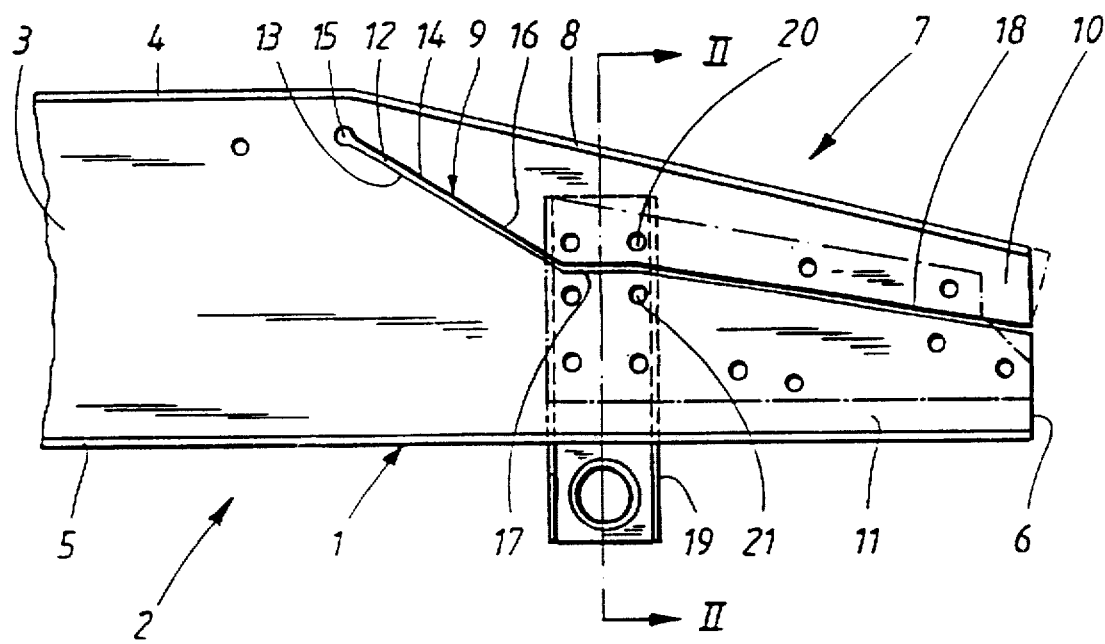
FIG. 1 is a partial side, elevational view of an end section according to the present invention.
Figure 2:
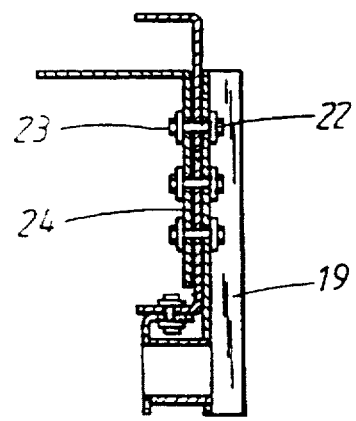
FIG. 2 is a cross-section of the end section taken along line II—II in FIG. 1.

Referring to the Drawings in which like reference numerals refer to like portions thereof, FIGS. 1 and 2 show a partial view and a cross-section, respectively, of an end section 1 of a frame member 2 forming part of a frame construction for a load-carrying vehicle. In this example, the frame member 2 is formed as a U-beam with an upright web 3 and an upper laterally directed flange 4 and a lower laterally directed flange 5. The upper, laterally directed, flange 4 may also be regarded as an upper supporting section, whereas the lower flange 5 is a lower supporting section in the sense that they usually form supporting surfaces or bearing surfaces, apart from giving the beam its inherent strength in the form of stiffness, etc. The web 3 may be regarded as a connection section between the upper and lower supporting sections, which cooperates with these in order to give the beam its total strength properties. Like the remaining portion of the frame member, the end section presents a section of conventional construction with a uniformly U-shaped cross-section, but changes into a section 7 of gradually decreasing height in a direction towards the end 6 of the frame member. The upper supporting section, i.e. the flange 4, forms along this section an inclining plane 8 which can form, for example, a bearing surface for a coupling plate on a tractor unit of the semi-trailer type so that the coupling plate obtains the desired inclination in order to lift the front end of the corresponding trailer unit during connection.

In accordance with the present invention, the connection section 3 is split along the section 7 of diminishing height of the end section 1, along a parting or dividing line 9, into an upper portion 10 which is attached to the upper supporting section 4 and a lower portion 11 which is attached to the lower supporting section 5. In practice, the parting line 9 is formed by a gap 12 which is delimited by two edge sections, 13 and 14, which extend in a parallel manner. The gap 12 starts at a location 15 which is located in the vicinity of the flange 4, i.e. high up in the web 3 in order to extend obliquely along a first section 16 towards the mid portion of the web in a straight line. In the vicinity of the mid portion of the web and in practice slightly higher than an imagined mid line, the gap presents a relatively short horizontal section 17. Thereafter, the gap extends substantially parallel to the inclined plane 8 of the flange 4, along an outer section 18 all the way to the rear end 6 of the frame member. As is apparent, the gap 12 is formed as a hole at the starting point 15, which will be described in greater detail below.

In accordance with the present invention, the web of the frame member is kept together in the section 7 of diminishing height by means of a plate 19 which extends parallel to the web 3, preferably in close proximity thereto, and which is connected to the upper and lower portions, 10 and 11, of the web by means of screws or rivets. For this purpose, the web presents several through holes, 20 and 21, in said upper and lower portions on the opposite sides of the gap 12, while it is ensured that the plate 19 presents holes arranged at corresponding locations so that screws 22 and associated nuts, or alternatively rivets 23, form a tight connection between the plate and the upper and lower portions of the web, respectively. In FIGS. 1 and 2 the described plate 19 is shown attached to the outside of the beam, whereas a second plate 24 is arranged on the inside of the beam and is connected to the web and plate 19 of the beam by means of a common screw/rivet joint. Thus, in this manner, the plate 24 also presents holes at corresponding locations for the insertion of screws/rivets, as well as additional holes, since this plate 24 is larger.

Figure 3:
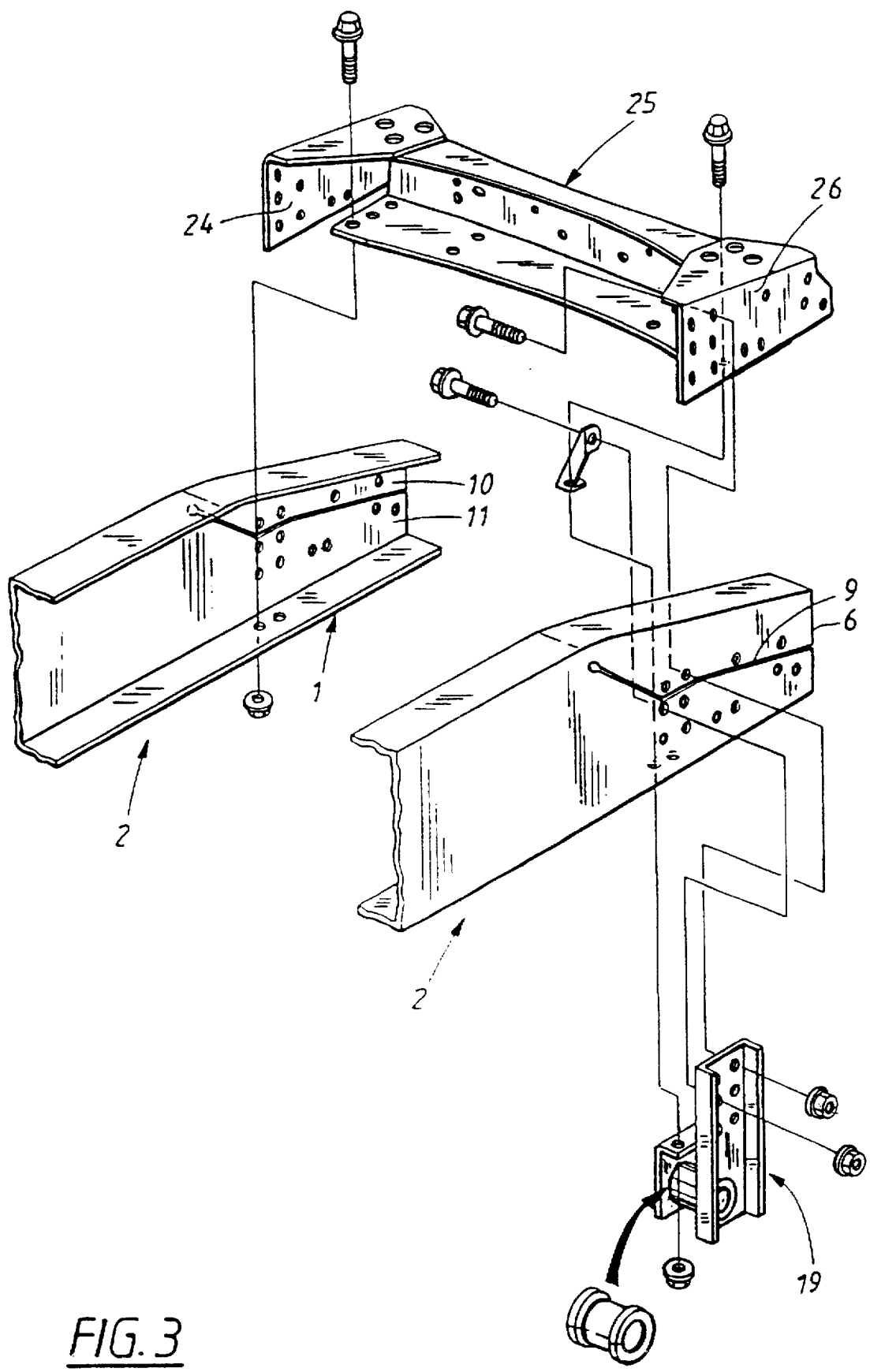
FIG. 3 is a perspective exploded view of two end sections according to the present invention formed together by means of a crossbar.

FIG. 3 shows a more complete embodiment of an end section 1 of a frame member design in which two parallel frame members 2 are mutually connected by means of a crossbar 25 by means of the above-described internal plate 24, which is also called a junction plate. The crossbar 25 thus presents two junction plates, 24 and 26, one in each end, which thus have both the function of keeping together the upper and lower sections, 10 and 11, of the web and also to connect the two end sections 1 via the crossbar 25. In this example, the outer plate 19 simultaneously forms an attachment for another component of the vehicle, for example an attachment for a shock absorber or stabilizer (not shown).

Figure 4:
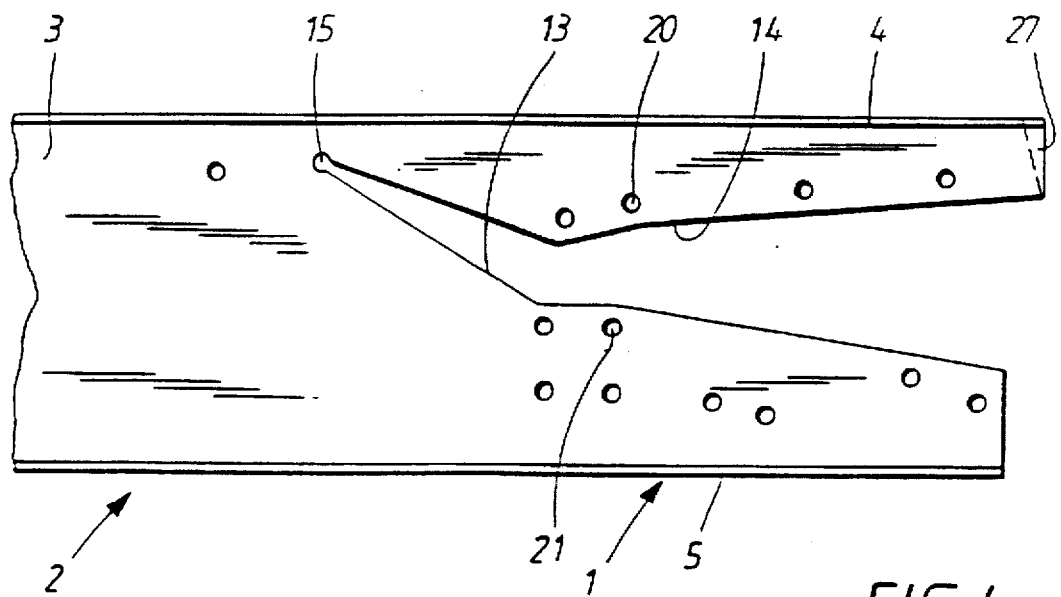
FIG. 4 is an end section of the present invention shown in a first production stage.
Figure 5:
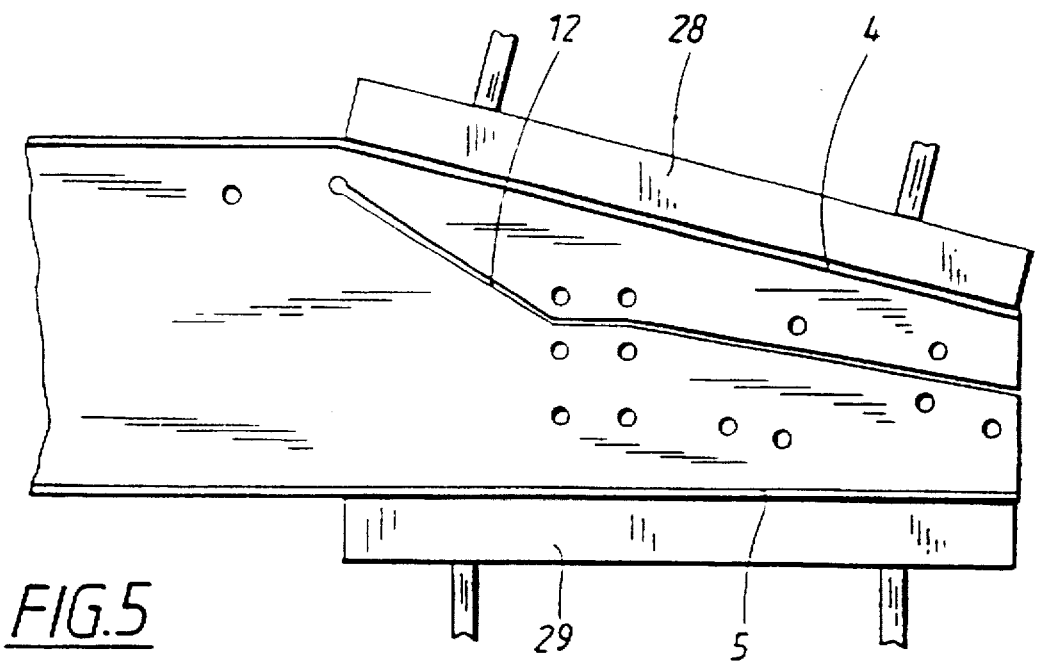
FIG. 5 is the end section of FIG. 4 shown in a second production stage.

According to the present invention, the section 7 of diminishing height of the end section 1 is produced from a section of a conventional frame member 2, as is apparent from FIG. 4. Thus, at the outset the original construction of the frame member having a uniform cross-section is used, in which a wedge-shaped recess is cut out so that the two edge sections 13 and 14 are formed which meet each other at the inner end 15. The formation of the holes, 20 and 21, in the web 3, both the holes which are common to the plates, 19 and 24, as well as additional holes for the wider plate 24, is preferably carried out at this stage, wherein a predetermined orientation in relation to the edge sections, 13 and 14, is chosen. An outer section 27 is cut obliquely in order to form a straight rear edge in the final state.

By means of clamping means, 28 and 29, which are applied to the upper and the lower flanges, 4 and 5, respectively, the section of the flange 4 which is arranged above the cut-out section of the web 3 is bent down, the hole 15 thereby forming a pivot point for such bending movement. By forming the hole and by means of its orientation in the vicinity of the flange 4, a minimum of deformation takes place in the surrounding material and strength in the beam is maintained. The deflection or bending is carried out until the gap 12 obtains an essentially homogeneous width, after which one or both of the two plates, 19 and 24, are mounted during maintained tension by the clamping means, 28 and 29. When the clamping force is released, the bent portion has a tendency to spring back, which is absorbed by the screw joint via the plates, 19 and 24.

The invention is not limited to the embodiment described above and shown in the Figures, but may be varied freely within the scope of the appended claims. For example, the beam can have another profile, for example an I-beam, though a box-shaped beam or a T-beam are also possible. Furthermore, the parting line may extend in a different manner than that which is shown. It is also possible that only one plate is provided.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

We claim:

1. A frame member including an end for a load-bearing vehicle comprising an upper support section, a lower support section, a connecting section joining said upper and lower support sections, said frame member including an end section having a height representing the distance between said upper and lower support sections which decreases in the direction towards said end, said end section including an upper end portion and a lower end portion separated by a gap, said upper and lower end portions meeting at a central end portion, and attachment means for maintaining the relative positions of said upper and lower end portions, said attachment means including first affixing means for affixing said attachment means to said upper end portion and second affixing means for affixing said attachment means to said lower end portion.

2. The frame member of claim 1 wherein said gap extends from a first point to said end of said frame member, said first point being proximate to said upper support section and at least a portion of said gap proximate to said first point extending towards said central end portion.

3. The frame member of claim 2 wherein said first point comprises a hole through said connecting section.

4. The frame member of claim 1 including a crossbar extending transversely of said frame member, said attachment means attached to said crossbar.

5. The frame member of claim 1 wherein said attachment means comprises a first attachment member on a first side of said end section, and including a second attachment member on a second side of said end section.

6. A method for producing a frame member including an end for a load-bearing vehicle, said method comprising the steps of: providing said frame member, with an upper support section, a lower support section and a connecting section joining said upper and said lower support sections; cutting out a wedge-shaped section of said connecting section so as to create an upper end portion and a lower end portion; bending said upper support section towards said lower support section at said end of said frame member so as to provide an end section of said frame member having a height representing the distance between said upper and lower support sections which decreases in the direction towards said end; and attaching said upper end portion to said lower end portion with at least one plate so as to maintain a gap separating said upper and lower end portions.

* * * * *